July 21, 1953  P. A. C. JACQUIER  2,646,457
ELECTRODE FOR ALKALINE BATTERIES
Filed July 10, 1951
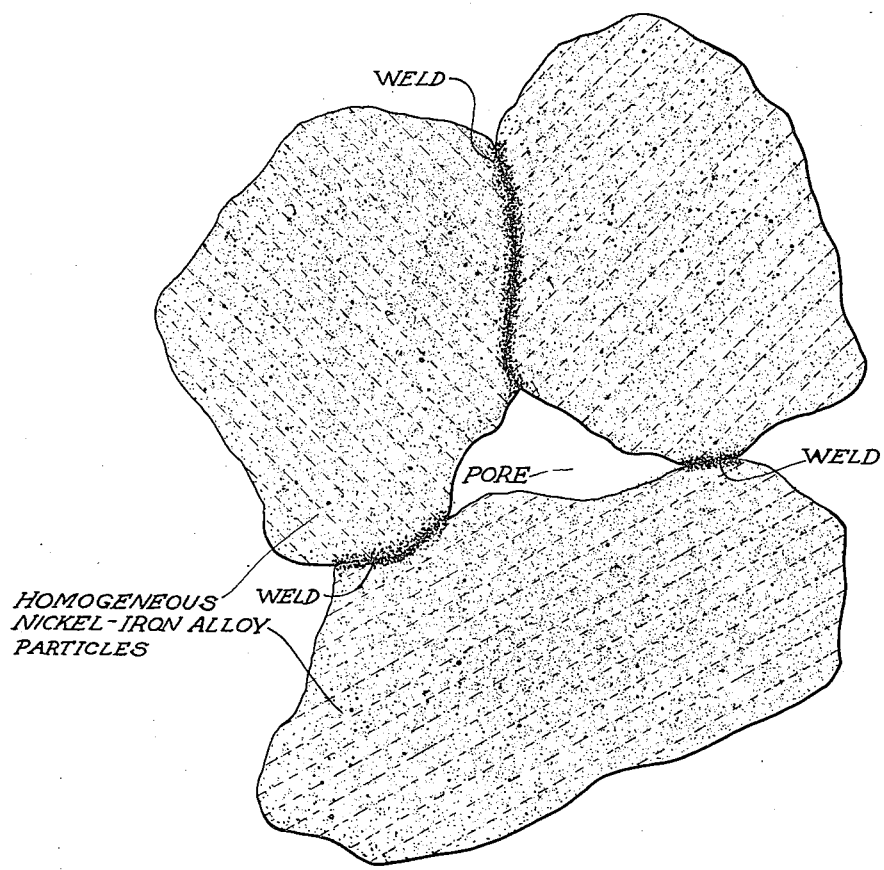
INVENTOR.
Pierre A. C. Jacquier
BY
Kenyon & Kenyon
ATTORNEYS Patented July 21, 1953

2,646,457

UNITED STATES PATENT OFFICE 2,646,457

ELECTRODE FOR ALKALINE BATTERIES

Pierre A. C. Jacquier, Paris, France, assignor to Societe des Accumulateurs Fixes & de Traction, Romainville, France, a French body corporate Application July 10, 1951, Serial No. 236,070
In France June 30, 1950

12 Claims. (Cl. 136—28)

This invention relates to electrodes for alkaline storage batteries and especially the carriers or supports upon which the active material is carried to form a complete electrode, and the invention has a particular value in connection with positive electrodes. The invention relates to the carriers and electrodes and to the process for the production thereof.

It has been proposed to produce electrodes for alkaline storage batteries by sintering suitable metallic powder to produce porous carriers of relatively low density and then impregnate such carriers with suitable active material. The porous carrier must remain inactive or in a passive state during the operation of the storage battery and heretofore the porous carriers used for the positive electrode have been made entirely of nickel for the purpose of insuring that they remain in a passive state.

I have found that although pure iron is electrolytically active during operation of an alkaline battery, the great expense of using pure nickel can be extensively avoided by providing a sintered porous carrier for positive plates of alkaline batteries wherein the metal is an alloy of nickel and iron in which nickel is present in a proportion of at least 20% of the combined weight of iron and nickel. The proportion of nickel can be increased to any value up to that at which the saving effected by inclusion of iron becomes negligible.

I have found that such an alloy carrier can be produced by sintering fine particles of nickel-iron alloy or by sintering a uniform homogeneous mixture of fine particles of iron with fine particles of nickel, it being advantageous in the latter case to have the iron particles and nickel particles especially fine and preferably of the order of 1 micron or smaller in diameter.

Mixing of separately prepared fine iron powder and fine nickel powder to the extent necessary to produce a uniform homogeneous mixture thereof would impair the structure and porosity of the particles and increase the density of the body of powder and decrease the porosity of the sintered mass. Accordingly, another feature of my invention is that the homogeneous uniform mixture of separate iron particles and nickel particles is produced by decomposing a mixture of an iron compound with a nickel compound, the decomposition being effected by a thermal action or by a procedure including a reducing action.

According to my invention, the homogeneous and uniform mixture of nickel particles and iron particles can be produced in either a wet operation or a dry operation. As an example of the wet operation, insoluble salts of nickel and iron are simultaneously precipitated from a solution of soluble salts of both of the metals; and the metal powder is easily produced from the precipitate, as by an operation including reduction in an atmosphere of hydrogen, examples of such precipitated salts being iron and nickel carbonates, formates and oxalates. As an example of a dry operation, a mixture of iron and nickel carbonyls, in gaseous form, is decomposed by heat.

In the practice of my invention, the metallic powder, whether composed of particles of nickel-iron alloy or particles of iron homogeneously mixed with particles of nickel, is molded in the desired form with the least possible compacting, as by filling a mold and scraping off excess material by a non-compacting scraping operation; and the molded material is then sintered in a reducing atmosphere such as hydrogen, the sintering temperature being between about 800° C. and about 1050° C.

In the practice of my invention in which a mixture of iron particles with nickel particles is formed by decomposition of a mixture of iron compounds with nickel compounds, I do not know whether the alloying of the iron with the nickel occurs during the decomposition of the metal compounds to form the metal powder, or as a result of thermal diffusion of one metal into the other during the sintering, or partly during the decomposition with completion of the alloying during sintering. However, in the practice of my invention, whether starting with fine particles of nickel-iron alloy, or starting with a homogeneous mixture of iron compounds with nickel compounds, the final porous sintered mass constituting the carrier of the active material is composed of nickel-iron alloy and remains inactive in an alkaline solution and can be used as a carrier for the active materials of the positive electrode.

After completion of the sintering, the highly porous mass of nickel-iron alloy is impregnated or loaded in the usual manner with suitable active material, for example when impregnated or loaded with nickel hydrate a positive electrode is formed.

In the practice of that form of my invention in which there is a simultaneous precipitation of iron and nickel salts, such salts are preferably reduced to oxides and sifted to obtain very fine powder before being decomposed to produce metallic powder, as by a reducing operation.

The accompanying drawing is a diagrammatic illustration on a greatly enlarged scale of a fragmentary portion of a porous carrier made in accordance with the methods of this invention and illustrating diagrammatically the structure and inter-relationship of the homogeneous nickel-iron alloy particles forming the porous carrier.

The following examples will more fully disclose procedure in accordance with my invention to produce the carrier and electrode of my invention but it is to be understood that my invention is not limited to such examples but extends to battery elements of porous nickel-iron alloys however produced, and to the use, in the production of such elements, of finely powdered iron-nickel alloy or iron or nickel however produced.

Example I

I mixed 1.300 liters of an aqueous solution of nickel sulfate containing 91.7 grams of nickel per liter with 3.100 liters of an aqueous solution of iron sulfate containing 90 grams of iron per liter. To this mixture there was added, while stirring, 1270 grams of ammonium-dicarbonate dissolved in 9 liters of distilled water. A simultaneous precipitation of iron and nickel carbonates occurred. The final mixture was allowed to stand and decanted three times and the precipitate was wrung out and washed until the removal of sulfate was no longer observable. The washed precipitate was dried in air at 80° C. and sifted through a screen having 30 meshes to the inch. The resulting powder had a density of 0.46. The powder was then roasted with admixture of air at 700° C. for two hours. There resulted a mixture of iron and nickel oxides having a density of 0.51. The mixed oxides were heated at 700° C. for one and one-half hours in a hydrogen atmosphere. The resulting metallic powder mixture had a density of 0.52. The metallic powder was molded without compression into the form of a storage battery plate and sintered in a hydrogen atmosphere at 950° C. for one-half hour. The sintered mass obtained was nickel-iron alloy containing 30% of nickel, it had a porosity of between 75% and 85%, and it was impregnated in the usual manner with nickel hydrate and successfully used as the positive plate of an alkaline storage battery. In that use the nickel-iron alloy carrier did not lose its inactive or passive character.

Example II

By thermal decomposition of a gaseous mixture of nickel carbonyl and iron carbonyl a powder was obtained which contained 33.2% of nickel and 66.4% of iron (the balance being traces of carbon). The powder was molded without pressure in the form of a storage battery plate and sintered at 800° C. for one-half hour. There resulted a porous carrier of nickel-iron alloy having about 80% porosity which was successfully used as described in Example I as the positive electrode of an alkaline storage battery.

Positive electrodes for an alkaline storage battery which embody my invention or which are made in accordance with my process are highly porous and efficient and retain their inactivity or passivity and while I have given specific examples of procedure, it is to be understood that my invention is not limited by such examples but includes such features and modifications as fall within the appended claims.

What is claimed is:

1. A process for the production of a porous carrier body for an electrode for an alkaline storage battery, comprising the steps of molding without compression into the form of an electrode and then sintering without compression at a temperature between about 800° C. and about 1050° C. homogeneous powdery metallic products whose physical texture and composition is such that after sintering the metal constituting the porous body is a homogeneous alloy of iron-nickel containing at least 20% nickel.

2. The process of claim 1 wherein the powdery metallic products are an intimate mixture on an atomic scale of iron and nickel containing at least 20% nickel, said mixture being obtained by a reduction of a mixture of oxides of iron and nickel, and said mixture of oxides being obtained by precipitation from mixtures of solutions of sulphates, carbonates, oxalates and formiates of iron and nickel.

3. The process of claim 1 wherein the powdery metallic products are an alloy of pulverulent iron-nickel of low density containing at least 20% nickel obtained by the simultaneous thermal decomposition of a gaseous mixture of iron carbonyl and nickel carbonyl.

4. A process for the production of a porous carrier body for an electrode for an alkaline storage battery comprising the steps of mixing aqueous solutions of soluble iron and nickel salts, adding a carbonate solution and simultaneously precipitating iron and nickel carbonates, washing the precipitate, drying the latter in air, sifting the dried precipitate through a screen of determined mesh size, roasting the sifted precipitate with admixture of air to produce a mixture of iron and nickel oxides, heating the mixed oxides in a hydrogen atmosphere to produce a metallic powder consisting of a mixture of iron and nickel, molding the metallic powder without compression into desired shape of the porous carrier body and sintering the molded mixture in a hydrogen atmosphere to produce a porous nickel-iron alloy carrier body having said desired shape.

5. The process of claim 4 wherein the roasting is effected at a temperature of approximately 700° C. and carried on for approximately two hours, wherein the heating of the mixed oxides to produce the metallic powder is effected at approximately 700° C. for approximately one and one-half hours and wherein the sintering is effected at temperatures of about 800° C. to 1050° C. for about one-half hour.

6. The process of claim 4, including the step of impregnating the porous nickel-iron alloy sintered body with active positive electrode material.

7. A process for the production of a porous carrier body for an electrode for an alkaline storage battery comprising the steps of thermally decomposing a gaseous mixture of nickel carbonyl and iron carbonyl to produce a metallic powder consisting substantially of a homogeneous mixture of nickel and iron, molding the metallic powder without compression into desired shape of the porous carrier body and sintering the molded mixture in a hydrogen atmosphere to produce a porous nickel-iron alloy carrier body having said desired shape.

8. The process of claim 7 wherein the sintering is effected at temperatures of from about 800° C. to about 1050° C. for about one-half hour.

9. The process of claim 7, including the step of impregnating the porous nickel-iron alloy carrier body with active positive electrode material.

10. A process for the production of a porous carrier body for an electrode for an alkaline storage battery comprising the steps of providing an intimate mixture of light homogeneous metallic powder consisting substantially of iron and nickel, molding the said powder without compression into desired shape of the porous carrier body and sintering the molded mixture in a hydrogen atmosphere to produce a porous nickel-iron alloy carrier body having said desired shape.

11. A porous carrier body for an electrode for an alkaline storage battery produced by the process of claim 1 and characterized by consisting of an iron-nickel alloy containing at least 20% nickel.

12. A porous carrier body for an electrode for an alkaline storage battery produced by the process of claim 10.

PIERRE A. C. JACQUIER.

References Cited in the file of this patent

UNITED STATES PATENTS

| Number | Name | Date |
|---|---|---|
| 1,506,246 | McMahon | Aug. 26, 1924 |
| 1,986,197 | Harshaw | Jan. 1, 1935 |
| 1,988,861 | Thorausch | Jan. 22, 1935 |
| 2,198,042 | Schlecht | Apr. 23, 1940 |
| 2,289,897 | Balke | July 14, 1942 |
| 2,544,112 | Schneider | Mar. 6, 1951 |

FOREIGN PATENTS

| Number | Country | Date |
|---|---|---|
| 429,513 | Great Britain | May 31, 1935 |
| 653,235 | Great Britain | May 9, 1951 |